US011100459B2

(12) United States Patent
Ponte et al.

(10) Patent No.: US 11,100,459 B2
(45) Date of Patent: Aug. 24, 2021

(54) SYSTEMS AND METHODS FOR ARTICLE INVENTORY TRANSFER

(71) Applicant: CaaStle, Inc., New York, NY (US)

(72) Inventors: Ericka Ponte, Delaware, OH (US);
Alyssa Packard, Asheville, OH (US);
Lindsey Winland, Dublin, OH (US);
Varun Kumar, Danville, CA (US);
James Woods, Glendale, AZ (US);
Prashant Rao, San Jose, CA (US);
Georgiy Goldenberg, Los Altos, CA (US)

(73) Assignee: CaaStle, Inc., New York, NY (US)

( * ) Notice: Subject to any disclaimer, the term of this patent is extended or adjusted under 35 U.S.C. 154(b) by 0 days.

(21) Appl. No.: 16/288,545

(22) Filed: Feb. 28, 2019

(65) Prior Publication Data

US 2020/0279210 A1    Sep. 3, 2020

(51) Int. Cl.
*G06Q 10/08* (2012.01)
*G06F 16/903* (2019.01)
*G06F 9/54* (2006.01)

(52) U.S. Cl.
CPC ......... *G06Q 10/087* (2013.01); *G06F 16/903* (2019.01); *G06Q 10/0832* (2013.01); *G06F 9/542* (2013.01)

(58) Field of Classification Search
CPC .................................. D06F 95/00; G09F 3/00
See application file for complete search history.

(56) References Cited

U.S. PATENT DOCUMENTS

| 5,088,586 | A | * | 2/1992 | Isobe | G06Q 20/203 |
| | | | | | 194/205 |
| 5,794,213 | A | * | 8/1998 | Markman | D06F 95/00 |
| | | | | | 705/22 |
| 9,280,148 | B1 | * | 3/2016 | Colett | G06K 19/00 |
| 9,616,466 | B1 | * | 4/2017 | Bauer | B07C 5/3412 |
| 9,818,007 | B1 | * | 11/2017 | Bajovic | G06K 7/10386 |
| 10,255,629 | B2 | * | 4/2019 | Bajovic | D06F 33/00 |
| 2001/0047348 | A1 | * | 11/2001 | Davis | G06F 16/40 |
| 2003/0019798 | A1 | * | 1/2003 | Capps | D06F 95/00 |
| | | | | | 209/630 |
| 2006/0005071 | A1 | * | 1/2006 | Fu | D06F 93/00 |
| | | | | | 714/5.1 |
| 2006/0107295 | A1 | * | 5/2006 | Margis | H04N 7/163 |
| | | | | | 725/81 |
| 2007/0043811 | A1 | * | 2/2007 | Kim | G06Q 10/06 |
| | | | | | 709/203 |

(Continued)

*Primary Examiner* — Florian M Zeender
*Assistant Examiner* — Whitney Poffenbarger
(74) *Attorney, Agent, or Firm* — Bookoff McAndrews, PLLC (57) ABSTRACT

A computer-implemented method of managing an inventory of articles includes receiving, by a transfer processor, article information associated with the articles, and identifying, by the transfer processor, one of the articles based on an article identifier. The method also includes retrieving article information based on the identifier, the article information including care information for the one of the articles, and, when the identified article is an article requiring special care, a special care requirement is included in the care information, and preparing the article for transfer based on the care information.

16 Claims, 8 Drawing Sheets

(56) References Cited

U.S. PATENT DOCUMENTS

| | | | |
|---|---|---|---|
| 2007/0261997 A1* | 11/2007 | Cassady | B07C 5/3412 |
| | | | 209/3.3 |
| 2008/0115541 A1* | 5/2008 | Aldridge | D06F 33/02 |
| | | | 68/212 |
| 2015/0076220 A1* | 3/2015 | Nelson | G09F 3/04 |
| | | | 235/375 |
| 2016/0245665 A1* | 8/2016 | Logan | G07C 9/00 |
| 2016/0307381 A1* | 10/2016 | Siebels | H04L 9/3271 |
| 2017/0011452 A1* | 1/2017 | Beckham | G06Q 20/204 |
| 2017/0243282 A1* | 8/2017 | Koulis | G06Q 30/08 |
| 2017/0323264 A1* | 11/2017 | Subramanian | G06Q 10/083 |
| 2018/0165486 A1* | 6/2018 | Bajovic | G06K 7/10297 |
| 2018/0253785 A1* | 9/2018 | Chong | G06Q 30/0643 |
| 2018/0334315 A1* | 11/2018 | Zaremski | B65D 85/07 |

* cited by examiner

SYSTEMS AND METHODS FOR ARTICLE INVENTORY TRANSFER

TECHNICAL FIELD

The present disclosure relates generally to the field of processing an article for an end user and, more particularly, to systems and methods for transferring articles.

BACKGROUND

The clothing and fashion industry has traditionally depended on a business model by which customers purchase goods from physical retail locations. These goods are often discarded by the customer while the item remains in good condition or even excellent condition. Numerous retail locations are necessary to attract customers and provide sufficient space for the display of items and to stock items of different styles, sizes, etc. These physical retail locations are operated by teams of employees and are both labor-intensive and expensive to maintain. Additionally, each physical location can only attract consumers within a narrow geographic area. It is also expensive and difficult to adapt multiple retail locations to rapidly-changing trends.

Although many industries have successfully migrated to Internet-connected platforms, the clothing industry largely remains dependent on physical retail stores and traditional business models. Even when a sale of clothing is performed over the Internet, the item may still be used infrequently by a single consumer before being discarded. Thus, the fashion and clothing industry also produces a significant amount of waste. Accordingly, there is a need to transition to more efficient practices.

Various challenges face retailers seeking to transition to alternate strategies that provide items for short-term or temporary use. One such challenge lies in managing inbound articles for inspection, maintenance, cleaning, research, or stocking, and accumulating useful data based on the result of each activity. Current rental services do not typically perform service or repair on articles that are received by customers. Various challenges face retailers seeking to transition to alternate strategies that provide items for short-term or temporary use, especially when the items may require service, repair, or differing storage processes. One such challenge lies in managing inbound articles for inspection, maintenance, cleaning, research, or stocking, and accumulating useful data based on the result of each activity. Given the vast amounts of information that may be collected in numerous different categories, present systems are not equipped to make use of such information in a manner that is accurate and/or useful. There is a need for systems and methods to transfer an article, and to allow the article to be properly routed, as well as stored in a manner that best preserves the article. Such needs are particularly felt when articles are provided to multiple end users. Thus, the present disclosure is directed to processing an article for an end user and, more particularly, to systems and methods for transferring articles provided to multiple end users.

SUMMARY

According to certain aspects of the disclosure, systems and method are disclosed for transferring articles and identifying care requirements in a trackable and repeatable manner.

In one aspect, a computer-implemented method of managing an inventory of articles may include receiving, by a transfer processor, article information associated with the articles, and identifying, by the transfer processor, one of the articles based on an article identifier. The method may also include retrieving article information based on the identifier, the article information including care information for the one of the articles, and, when the identified article is an article requiring special care, a special care requirement is included in the care information, and preparing the article for transfer based on the care information.

In another aspect, a method of transferring an article may include receiving one or more articles at a transfer station, identifying, by a transfer processor, at least one of the articles by reading an article identifier associated with the at least one of the articles, and retrieving article information of the at least one of the articles based on the article identifier. The method may also include identifying a group identifier and updating, by the transfer processor, the article information with the group identifier, and transferring the article to a transfer location.

In another aspect, system for tracking an article during a transfer process may include a plurality of article identifiers associated with a corresponding plurality of articles, a reading device configured to read the article identifiers and output identifier information, and a transfer processor in communication with the reading device. The transfer processor may include one or more processors configured to receive the identifier information from the reading device, retrieve article information associated with the plurality of articles based on the identifier information, and identify care information of the plurality of articles based on the article information.

BRIEF DESCRIPTION OF THE DRAWINGS

It is believed that certain embodiments will be better understood from the following description taken in conjunction with the accompanying drawings, in which like references indicate similar elements and in which.

DETAILED DESCRIPTION OF EMBODIMENTS

While principles of the present disclosure are described herein with reference to illustrative embodiments for particular applications, it should be understood that the disclosure is not limited thereto. Those having ordinary skill in the art and access to the teachings provided herein, will recognize that the features illustrated or described with respect to one embodiment, may be combined with the features of another embodiment. Therefore, additional modifications, applications, embodiments, and substitution of equivalents, all fall within the scope of the embodiments described herein. Accordingly, the invention is not to be considered as limited by the foregoing description. Various non-limiting embodiments of the present disclosure will now be described to provide an overall understanding of the principles of the structure, function, and use of system and method for article inventory transfer.

As described above, there is a need in the field of processing, transferring, and tracking one or more articles after an inspection of the articles has been performed.

Figure 1:
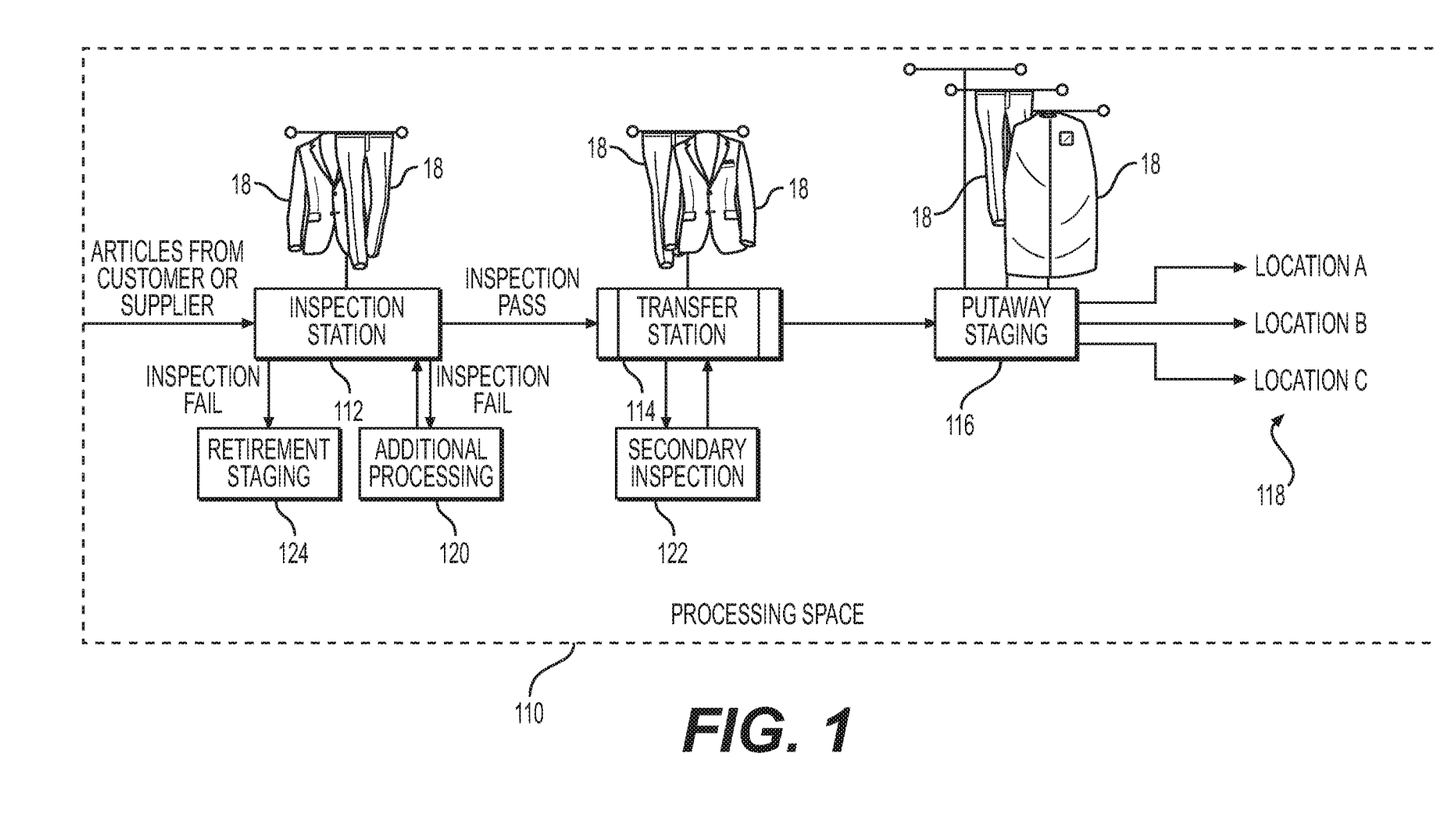
FIG. 1 is a schematic diagram of a workflow applicable to a service of providing articles including a transfer system according to an embodiment of the present disclosure.

FIG. 1 illustrates an exemplary workflow that may be applied to a service of providing articles 18 to end users (e.g., clothing as a service). The articles are, for example, garments, linens, and/or accessories that are provided as a service to numerous users. As shown in FIG. 1, one or more articles 18 are received in a processing space 110 before being transferred to one or more transfer or destination locations 118 within the processing space 110. Processing space 110 may be, for example, an interior of a warehouse in which a number of articles 18 are received, cleaned, inspected, repaired, stored, and/or prepared for shipment to users. Each article 18 may be a new article received from a supplier (new arrival) or an article that was worn by a customer.

As shown in FIG. 1, in general, processing space 110 may comprise an inspection station 112, a transfer station 114, a putaway staging area 116, a retirement staging area 124, an additional processing area 120, a secondary inspection station 122, and a plurality of destination locations 118. Destination locations 118 may be locations within a single processing space 110 or within multiple processing spaces 110. Similarly, while inspection station 112, transfer station 114, and putaway staging area 116 may each be located within a single processing space 110, one or more of these may be located in various warehouses or processing spaces 110. While one inspection station is illustrated in FIG. 1, a plurality of inspection stations 112 may be provided within processing space 110 to increase productivity. Similarly, multiple transfer stations 114 and putaway staging areas 116 may be provided, and may be present in more or fewer locations than inspection stations 112.

One or more articles 18 may be received in the processing space 110 to be transferred to one or more destination locations 118 within the processing space 110. Prior to being transferred to destination locations 118, each article 18 may be individually inspected at an inspection station 112. Depending on the result of the inspection performed at inspection station 112, the article 18 may be transferred to an additional processing area 120, a retirement staging area 124, or a transfer station 114. As can be seen in FIG. 1, articles 18 that pass inspection are relocated from inspection station 112 to a transfer station 114. From the transfer station 114, each article 18 may be subsequently transferred to putaway staging area 116 or to a secondary inspection station 122. From the putaway staging area 116, groups of articles 18 may be transferred to destination locations 118. One or more of the destination locations 118 may be a particular location in a warehouse in which processing space 110. These destination or transfer locations 118 may be identified by one or more of an aisle, shelf, bin, position, etc. The destination location 118 may also correspond to one or more of the areas or stations within processing space 110, such as retirement staging area 124, additional processing area 120, a secondary inspection station 122. In one example, a first destination location 118 (Location A, FIG. 1) may represent a storage location in a first warehouse, a second destination location 118 (Location B, FIG. 1) may represent a storage location in a second warehouse, while a third destination location 118 (Location C, FIG. 1) may represent a location within processing space 110 such as retirement staging area 124, additional processing area 120, a secondary inspection station 122.

Figure 2:
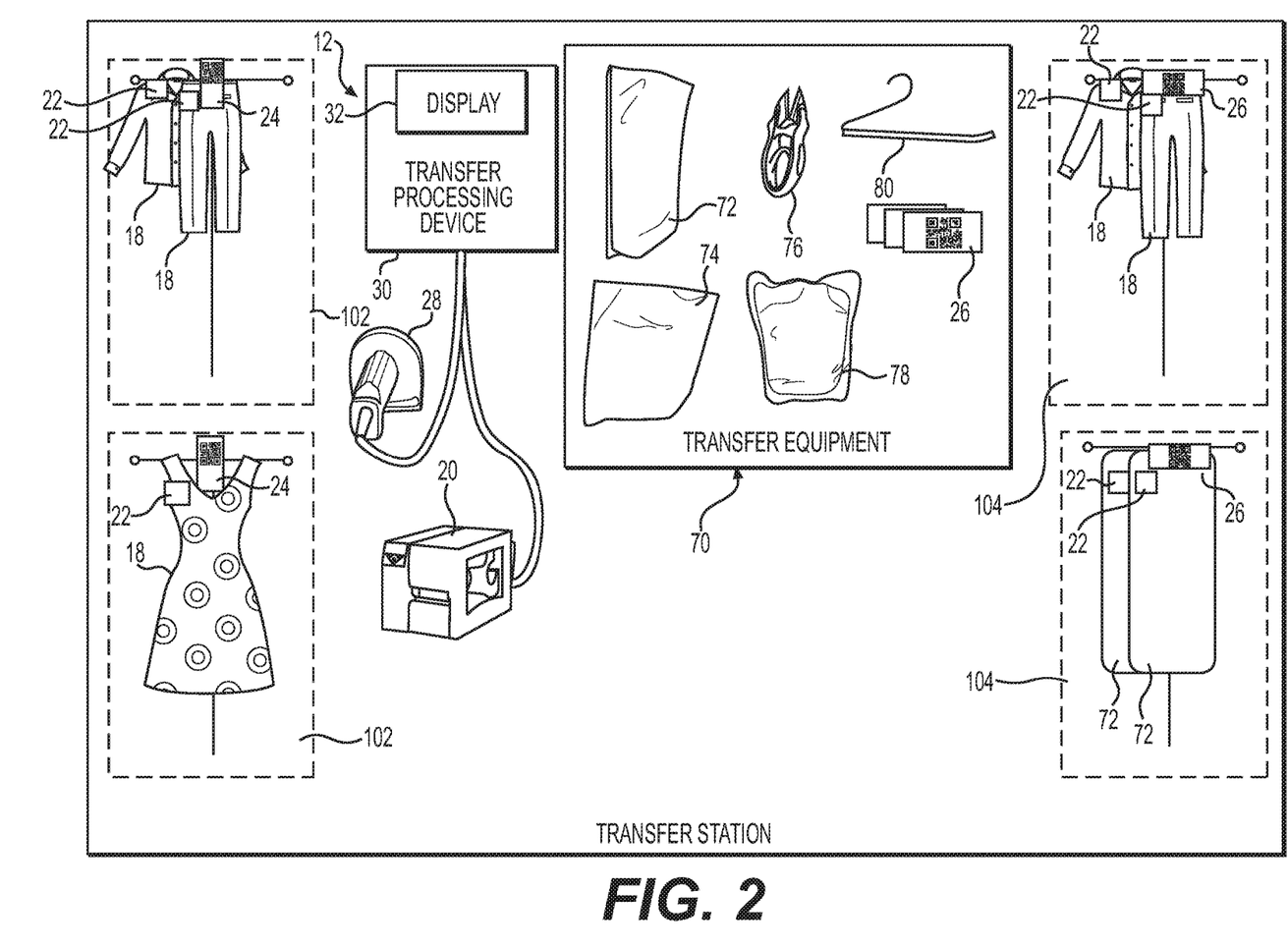
FIG. 2 is a partially schematic diagram illustrating a transfer station and transfer system according to an embodiment of the present disclosure.

FIG. 2 is a partially schematic diagram illustrating an exemplary transfer station 114 and an associated flow of articles 18 to and from transfer station 114. Transfer station 114 may include space(s) to organize articles 18 before or after generation of a transfer order, such as intake lanes 102 and outbound lanes 104. A transfer system 12 may be provided within transfer station 114 to assist in preparing articles for transfer. Transfer system 12 may include, for example, article identifiers 22, inspector identifiers 24, group identifiers 26, a transfer processor or transfer processing device 30, a reader 28 (also referred to herein as a "reading device") that is capable of reading identifiers 22, 24, and 26, an article label producer or labeler 20 that is capable of creating identifiers 22, 24, and 26, and transfer equipment 70. Transfer equipment 70 may include supplies for preparing articles 18 for transfer, including articles 18 that require special care.

Articles 18 that pass inspection may be delivered from inspection station 112 to transfer station 114. These articles 18 may be received in one or more intake lanes 102 that may be designated for the inspected articles 18. Articles 18 may be provided on one or more racks (e.g. Z-racks) and may be arranged in chronological order in which the articles 18 were inspected. Thus, articles 18 that arrive first may be processed first (i.e., first in first out). Articles 18 may be placed in multiple intake lanes 102 provided for different categories of articles 18. For example, one or more intake lanes 102 may be provided for articles 18 that do not require special care while one or more additional intake lanes 102 may be provided for articles 18 that have a special care requirement (special care articles). A special care requirement may be one or more of a laundering requirement (e.g., dry clean only), a protective storage requirement (e.g., climate control), a protective packaging requirement (e.g., storage in acid-free paper, storage in a garment bag, etc.), or an inspection requirement (e.g., secondary inspection required). In one aspect, a special care requirement may indicate that the article 18 is made of a material that requires special care, such as silk, leather, angora, or cashmere.

Each rack may contain one or more inspector identifiers 24 that are removably secured to the rack during the inspection at inspection station 112. Each inspector identifier 24 may correspond to a particular inspector and provide an identification of the inspector. For example, inspector identifiers 24 may encode an inspector identification number or an inspector identification code that is output to transfer processing device 30 when reader 28 reads an inspector identifier 24. Multiple inspector identifiers 24 may correspond to the same inspector, and thus identify various articles 18 that were evaluated by the inspector. Articles 18 on each rack may be divided by a series of inspector identifiers 24.

One or more outbound lanes 104 may be provided within transfer station 114. Each of the outbound lanes 104 may allow articles 18 to be arranged on racks in the order in which the articles 18 are processed by an operator of transfer station 114. These lanes 104 may be separated into one or more standard care lanes and one or more special care lanes. For example, each article 18 having a special care requirement for protective storage may be placed within protective packaging, such as acid-free paper 72, and placed within outbound lane 104.

While lanes 102, 104 may include lanes reserved for special care articles 18, one or more intake lanes 102 or outbound lanes 104 may be provided for new arrival articles 18, and/or for articles 18 that were worn by a customer.

As shown in FIG. 2, each article 18 may be associated with a unique article identifier 22. Transfer system 12 may include a transfer processing device that is configured to read the article identifiers 22 with reader 28. Transfer processing device 30 may include a computer system or web-based system that is operatively connected to reader 28. Transfer processing device 30 may include a display I/O or display 32 usable with reader 28. In one aspect, display 32 may be an input/output (I/O) device including a touchscreen. Additional I/O devices, such as a mouse or keyboard, may be included as I/O components of display I/O 32. Each article identifier 22 may represent (encode) various types of information that is deciphered by transfer processing device 30. For example, each article identifier 22 may encode a source (e.g., brand, manufacturer), category (e.g., dress, pants, top, etc.), style (e.g., summer, fall, beachwear, etc.), color, size, and/or serial number (e.g., one or more numbers or letters that uniquely identify identical articles 18).

Reader 28 may be a hand-held device configured to read identifiers 22, 24, and 26. For example, each of identifiers 22, 24, and 26 may be formed as a tag. As used herein a "tag" refers to at least one of a one-dimensional barcode, a two-dimensional barcode (e.g., a quick-response or "QR" code, FIG. 3), or a radio-frequency identifier such as an RFID tag, any of which may be read by reader 28. Alternatively, reader 28 may be affixed to or incorporated within transfer processing device 30. As used herein, "reading" contemplates at least one of scanning (e.g., by a detector that detects reflected light such as a laser), imaging (e.g., by a camera of a cellular phone), infrared communication, or radio-frequency communication. In one aspect, reader 28 may include a camera or other imaging device configured to image a one-dimensional or two-dimensional barcode. Reader 28 is able to output information corresponding to each identifier 22, 24, and 26 by reading or scanning the identifier.

Article label producer or labeler 20 is a device configured for producing any of the identifiers 22, 24, and 26, as noted above. Labeler 20 may be a device configured to create duplicates of identifiers 22, 24, and 26. Labeler 20 may include a printer or label printer configured to produce a copy by printing a duplicate of an identifier 22, 24, and/or 26. Labeler 20 may include an RFID reader/writer that may produce a copy of the identifier 22, 24, and/or 26 by writing or re-writing an electronic tag. Labeler 20 may be configured to produce a tag that is readable by reader 28. In one aspect, Labeler 20 may be configured to produce an article identifier 22 in an enlarged form, which may be useful for special care articles as discussed below.

Figure 3:
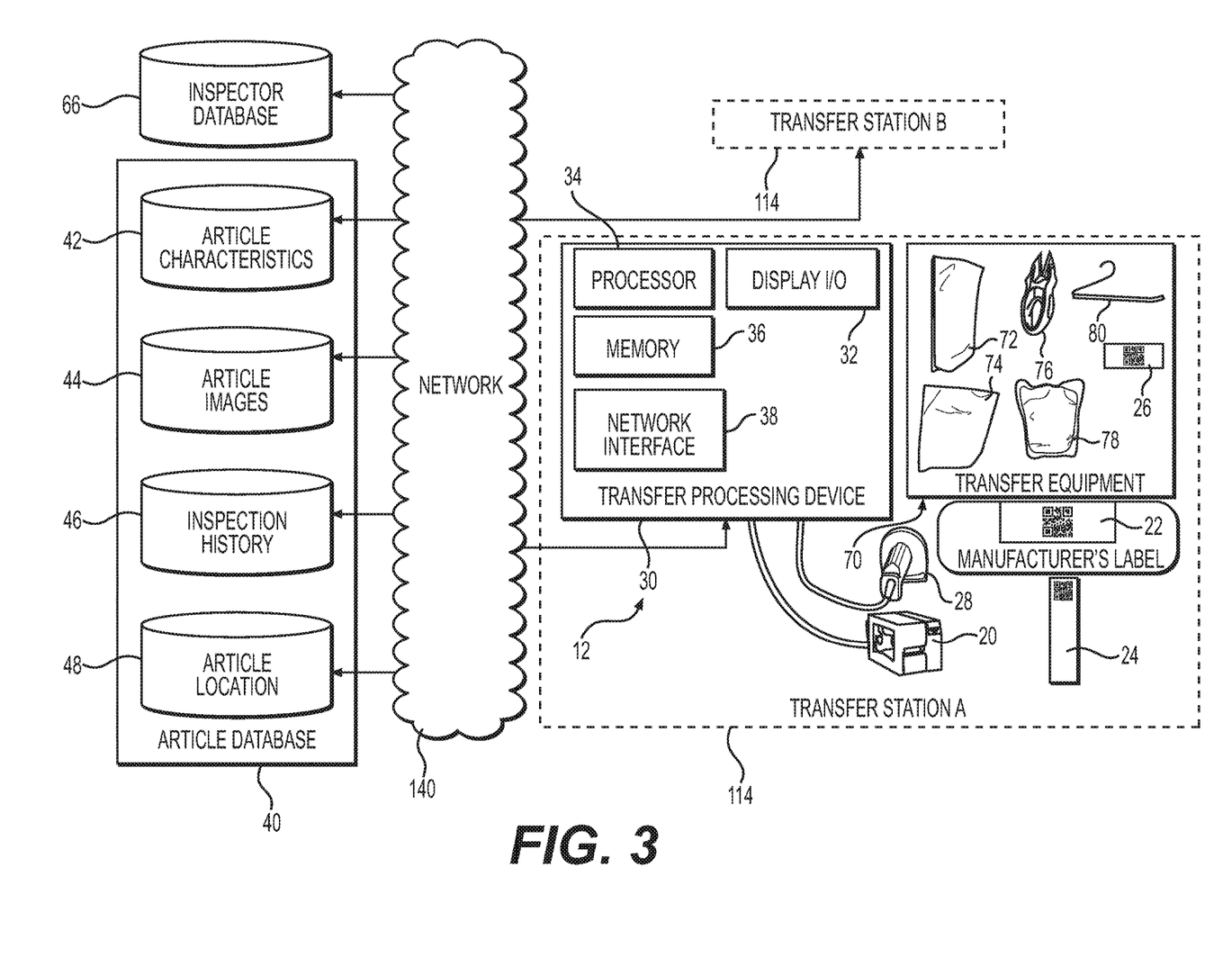
FIG. 3 is a block diagram illustrating the transfer station and transfer system of FIG. 3.

For ease of use, each article identifier 22 may be physically attached to an interior of the corresponding article 18 (e.g., by fastening article identifier 22 to an inside of a manufacturer's tag as shown in FIG. 3, or to a pocket on an interior of article 18). Thus, article identifier 22 may remain fixed to article 18 during the life of the article 18, including when article 18 is worn by a customer, transported, laundered, etc. The depiction of article identifier 22 is enlarged with respect to each article 18 in the depictions shown in FIG. 2. However, article identifier 22 may be provided in a size approximately the same as, or smaller than, a branding or care label provided on article 18 (FIG. 3).

With continued reference to FIG. 2, transfer equipment 70 may be provided to facilitate transfer operations. Transfer equipment 70 may include, for example, acid-free paper 72, tissue paper 74, cutting tool 76, breathable garment bags 78, and pant hangers 80. Acid-free paper 72, tissue paper 74, and breathable garment bags 78 may be used for special care articles that require protective packaging. Transfer equipment 70 may also include group identifiers 26. Group identifiers 26 may each correspond to a unique serial number or code that can be associated, by transfer processing device 30, with one or more articles 18.

FIG. 3 is a block diagram illustrating an article database 40 and an inspector database 66 that may be used with transfer processing devices 30 in one or more transfer stations 114 (e.g., transfer station A and transfer station B). While two transfer stations 114 are shown in FIG. 3, any number of transfer stations 114 may be provided. Additionally, each transfer station 114 may be dedicated to articles having a particular care requirement. For example, transfer station A may be dedicated to transfer operations for special care articles 18. Thus, the transfer equipment 70 provided to transfer station A may include all items necessary for transferring special care articles (e.g., each type of protective covering, and labeler 20). This equipment may not be necessary in transfer stations 114 that do not process special care articles 18.

Article database 40 and inspector database 66 may be operably connected, for example over network 140, with one or more transfer processing devices 30. In one aspect, network 140 may represent the Internet. However, network 140 may be a wired or wireless local network, or an intranet. Information stored in article database 40 and inspector database 66 may be accessible by each transfer processing device 30 via network 140, and may be added to, modified, or deleted by transfer processing device 30 following authentication.

Article database 40 and inspector database 66 may each include one or more storage devices that store article and inspector information, respectively. Each storage device of article database 40 and inspector database 66 may be formed by one or more hard disk drives, solid state drives, flash memory, USB storage devices, or other non-transitory storage media.

Article database 40 may include an article characteristics storage 42, article images storage 44, inspection history storage 46, and article location storage 48. Although each storage device is illustrated as a part of article database 40, one or more storage device may be combined and shared across one or more additional databases. Similarly, inspector database 66 may include a storage device that is shared with one or more of the devices of article database 40. Thus, when transfer stations 114 are located in processing spaces 110 of multiple warehouses, all of the information contained in article database 40 and inspector database 66 is readily accessed by each transfer processing device 30.

Whether article database 40 is connected to transfer processing device 30 by a global or local network 140, each transfer processing device 30 may access information stored in article characteristics storage 42, article images storage 44, inspection history storage 46, and article location storage 48, as well as information stored in inspector database 66. When reader 28 reads an article identifier 22, information encoded in the identifier (e.g., via a character string), is output by reader 28 and received by processing device 30. This information may form the basis of a query sent from processing device 30 to article database 40. In response to this query, article database 40 outputs, via network 140, information from one or more of the pieces of information associated with the corresponding article identifier 22. In one aspect, each article identifier 22 may encode a source (e.g., brand, manufacturer), category (e.g., dress, pants, top, etc.), style (e.g., summer, fall, beachwear, etc.), color, size, and/or serial number (e.g., one or more numbers or letters that uniquely identify identical articles 18), which may be stored in article database 40 and provided in response to a query by processing device 30. Thus, each article 18 may be identified in response to reading an article identifier 22 by reader 28.

When reader 28 reads an inspector identifier 24, reader 28 may output information that forms the basis of a query sent to inspector database 66 from processing device 30. In response to this query, inspector database 66 may provide processing device with information corresponding to the inspector. This information may include identification information of the inspector such as name and/or employee number. In addition, inspector database 66 may provide information indicating one or more articles that were previous inspected by the inspector. Processing device 30 may also send a query to any of the storage devices 42, 44, 46, and 48 of article database 40 in response to information received by reading inspector identifier 24. Similarly, when reader 28 reads a group identifier 26, a query may be sent to article characteristics storage 42, for example, requesting information corresponding to the group identifier 26. This may include an identifier unique to the group identifier 26 (e.g., one or more numbers or letters that uniquely identify the group identifier 26), and/or a list of articles 18 associated with the group identifier 26 (including an indication that no articles 18 are associated with the group identifier 26).

Examples of information output from article database 40 may include article characteristics stored in article characteristics storage 42. This information may include a source, category, style, color, size, etc. Care information may also be stored in article characteristics storage 42. This care information may include, for example, information indicating whether or not each article 18 has a special care requirement. The special care requirement may indicate a packaging requirement, such as a need to place the article 18 in a protective packaging. The special care requirement may indicate a storage requirement such as a requirement to store the article 18 in a climate controlled area. In one aspect, articles 18 formed of silk, leather, angora, or cashmere, or blends of any of these materials, may have a special care requirement stored in article characteristics storage 42. In one aspect, a special care requirement may indicate whether the associated article 18 requires special cleaning (e.g., dry cleaning).

Article characteristics stored in article characteristics storage 42 may also include information for each of the group identifiers 26. In one aspect, each group identifier 26 may be associated with one or more articles 18. Thus, article characteristics storage 42 may store a list of articles 18 associated with a particular group identifier 26. In one aspect, a predetermined maximum number (group maximum) of articles 18 may be associated with each one of the group identifiers 26. When no articles 18 are associated with a group identifier 26 read by reader 28, this information may be provided to processing device 30 from article characteristics storage 42.

Article images storage 44 may include a photograph or stock image of the article 18. This image may represent an initial state of the article 18 when the article 18 is in new condition.

Inspection history storage 46 may include a complete history for every inspection performed for each article 18. The history may be stored in a generalized form (e.g., pass/fail information) or may be more granular. In one aspect, inspection history information in storage 46 may have been recently updated based on an outcome of an inspection performed at inspection station 112. Transfer processing device 30 may determine the result of an inspection by receiving information from inspection history storage 46.

Location information of each article 18 may be stored in article location storage 48. This location information may specify a location of the article 18 within a particular processing space 110, a particular location within processing space 110 (e.g., awaiting processing at secondary inspection station 122), or may indicate that the article 18 is with a customer (e.g., by storing a unique user identification number associated with the customer). Thus, a detailed status of article 18 may be stored in article location storage 48. Storage 48 may also store a location for each group identifier 26. Processing device 30 may update location information for a plurality of articles in storage 48 simultaneously by updating a location of a single group identifier 26.

Transfer processing device 30 may also access information stored in inspector database 66 via network 140, as shown in FIG. 3. As discussed above, inspection processing device 30 may include a computer. A memory 36 of processing device 30 may store instructions that, when executed by one or more processors 34, allow processing device 30 to operate as discussed herein. Inspection processing device 30 may include a wired or wireless network interface 38 configured to access article database 40 through a network 140. Thus, in one example, when reader 28 reads an inspector identifier 24, information encoded in the inspector identifier can be output by reader 28 and received transfer processing device 30. Based on this information, transfer processing device 30 may send a query to inspector database 66. In response to the query, information stored in inspector database 66, such as an inspector name, articles previous inspected by the inspector, etc., may be received by transfer processing device 30.

Information stored by article database 40 and inspector database 66 may be updated by processing device 30 in response to the output of reader 28. For example, information stored in inspector database 66 may be updated in response to reading one or more identifiers 22, 24, 26. By first reading an inspector identifier 24, subsequently-read article identifiers 22 may then be associated with the inspector indicated by inspector identifier 24. Transfer processing device 30 may update the information stored in inspector database 66 and/or inspection history storage 46 to associate the articles 18 and article identifiers 22 with the information from the most recent inspection performed on these articles 18. This inspection information is, for example, information that was updated following an inspection at inspection station 112 prior to receiving the articles at transfer station 114 (see FIG. 1).

Additionally, reader 28 may read a group identifier 26 which is empty, i.e. not associated with any articles 18. One or more article identifiers 22 that are subsequently read by reader 28 may then be associated with this group identifier 26 by transfer processing device 30, which may then update information stored in article characteristics storage 42 and/or article location storage 48. This may include generating and/or adding to list of articles 18 associated with the group identifier 26, and generating and/or updating a location of one or more articles 18 associated with a group identifier.

When a group identifier 26 is read during a transfer process, it may be desirable to ensure that the group identifier 26 is empty. In a case where a group identifier 26 read by reader 28 is not empty, transfer processing device 30 may cause display 32 to display a warning indicating that the group identifier 26 is not suitable for use in the transfer process. Thus, an operator may discard the group identifier 26 or place the group identifier 26 in a location to be investigated or cleared of any articles 18 that remain associated with the group identifier 26.

An operation of labeler 20 may also be performed based on an article identifier 22 that is read with reader 28. In one aspect, information corresponding to article 18 may be provided to transfer processing device 30 from article characteristics storage 42 in response to a query from device 30. This information may indicate that article 18 is an article requiring special care (special care article). Based on the determination that article 18 is a special care article, transfer processing device 30 may control labeler 20 to produce a duplicate of the previously-read article identifier 22. Additionally, or alternatively, processing device 30 may also display a prompt on display 32. This prompt may indicate that article 18 is a special care article, and may also prompt a transfer operator to activate labeler 20 and produce a duplicate of the previous article identifier 22 (e.g., by printing the identifier on a label, writing to an RFID tag, etc.)

Figure 4A:
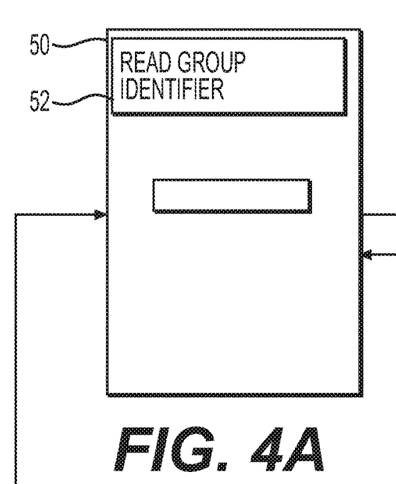
FIG. 4A-4D illustrate an exemplary series of prompts and tags presented on a display of the transfer processing device according to an embodiment of the present disclosure.
Figure 4B:
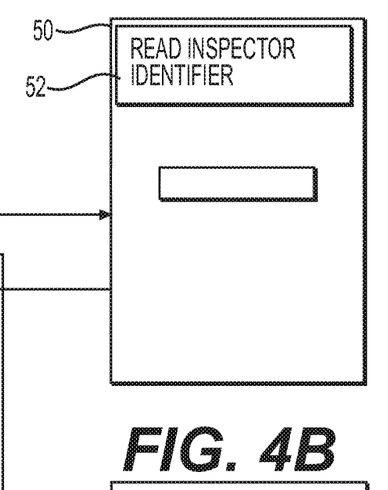
Figure 4C:
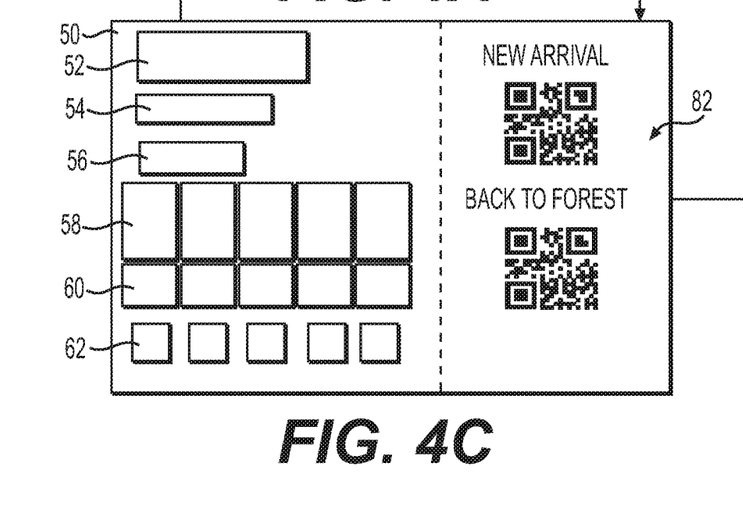
Figure 4D:
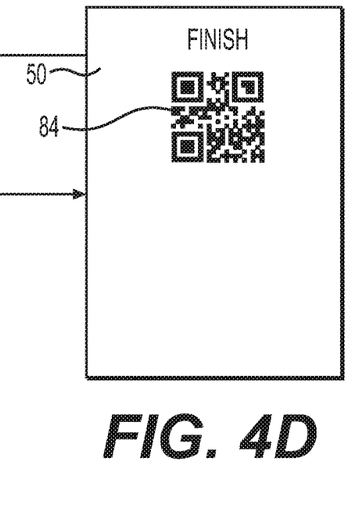

FIGS. 4A-4D illustrate an exemplary series of prompts and tags that may be presented on display 32 according to an embodiment of the present disclosure. As shown in FIGS. 4C and 4D, one or more entries 82, 84 may be displayed on display 32. These entries 82, 84 may be either touchscreen objects (e.g., buttons) on a touchscreen display 32, and/or tags (e.g., one-dimensional barcodes, two-dimensional barcodes, or other codes that can be read by reader 28) displayed on display 32 and may be entered by reading the desired entry with reader 28. Physical tags corresponding to entries 82 and/or 84 may also be provided to transfer station 114.

FIG. 4A shows an exemplary on-screen image 50 that may be displayed following authorization of the operator of transfer processing device 30. Image 50 may include a status indication 52 that guides an operator with a series of prompts. For example, as shown in FIG. 4A, status indication 52 may prompt the operator to read a group identifier 26. In response to the entry of group identifier 26, (e.g., via reader 28 or a mouse or keyboard of display I/O 32) an updated on-screen image 50 may be presented on display 32. As can be seen in FIG. 4B, the updated on-screen image 50 may include an updated status indication 52, such as a prompt for the operator to read an inspector identifier 24.

Figure 5:
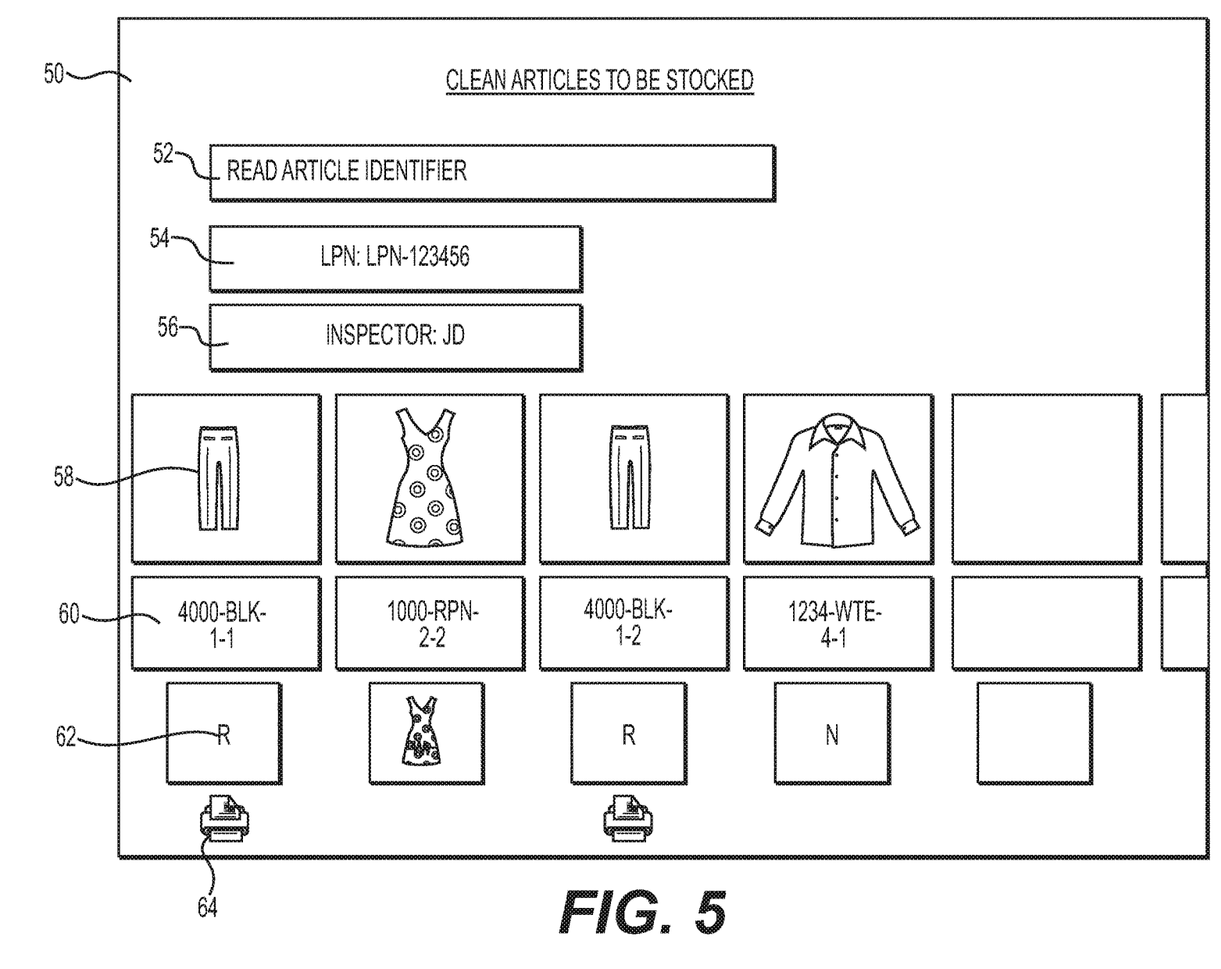
FIG. 5 illustrates an exemplary image presented on a display by a transfer processing device of the transfer system according to an embodiment of the present disclosure.

As shown in the left portion of FIG. 4C, when an inspector identifier 24 is read, for example in response to the prompt shown in FIG. 4B, image 50 may be updated to display status indication 52, group identifier image 54, inspector identifier image 56, article image 58, article identifier image 60, article category image 62, and, when applicable, an identifier prompt image 64 (FIG. 5). These images 58, 60, and 62 may be presented in a series of columns, each corresponding to a particular article 18. Thus, when a series of article identifiers 22 are sequentially read by reader 28, information corresponding to the article 18 and received from article database 40 may provide information presented in images 58, 60, and 62.

While FIG. 4C illustrates an exemplary image 50 containing five columns, ten, fifteen, or more columns may be displayed. In one aspect, the number of columns may correspond to a maximum number of articles 18 that may be associated with each group identifier 26. As article identifiers 22 are read and the corresponding images 58, 60, and 62 in each of these columns may be updated to present corresponding information to the operator. During the process of reading the article identifier 22, processing device 30 may update article database 40 by associating article identifier 22 with the previously-read group identifier 26. Image 50 of FIG. 4A may again be presented once the group maximum for group identifier 26 has been reached.

With reference to the right portion of FIG. 4C, on-screen image 50 may present a window, portion of a window, or a separate tab that includes one or more article category entries 82. These category entries 82 may correspond to new arrival articles or articles received from a customer, as shown in FIG. 4C. Category entries 82 may also be provided as physical tags within transfer station 114. These category entries 82 may be read prior to reading an article identifier 22. Thus, article identifiers 22 may be associated with the category indicated by entry 82.

FIG. 4D illustrates an exemplary completion entry 84 that may be read by reader 28 or otherwise selected to cause processing device 30 to update the information stored in article characteristics storage 42 and/or article location storage 48 and associate one or more article identifiers 22 with a group identifier 26. Thus, when fewer than a group maximum of articles 18 is present, the information for these articles 18 may be updated in a similar manner as described with respect to FIG. 4C. While completion entry 84 may be presented as part of image 50, completion entry 84 may be a physical tag provided within transfer station 114.

FIG. 5 illustrates an exemplary image 50 (corresponding, for example, to FIG. 4C) that may be displayed on display 32 during a transfer process for an article 18. Image 50 may provide information in each of the status indication 52, group identifier image 54, inspector identifier image 56, article image 58, article identifier image 60, article category image 62, and identifier duplicator prompt 64. As shown in the upper portion of the exemplary on-screen image 50 in FIG. 5, a status indication 52 may provide a visual guide or prompt to an operator of transfer processing device 30. In one aspect, status indication 52 may be indicative of a status of processing device 30, and may request an action such as an authentication, and/or an input (by reading) of identifier 22, 24, or 26.

Transfer processing device 30 may display a group identifier image 54 in response to reading a group identifier 26. This group identifier image 54 may include a presentation of the information encoded by group identifier 26, such as a unique serial number or code. Similarly, an inspector identifier image 56 may be displayed in response to reading an inspector identifier 24. The information in image 56 may contain some or all of the information received in response to query to databases 40 and 66. A name, employee number, or other indication may be presented as inspector identifier image 56 to indicate which inspector was identified by processing device 30.

One or more columns of on-screen image 50 may display information relating to each article 18 that is processed by transfer processing device 30. Each column may display information as article image 58, article identifier image 60, article category image 62, and/or identifier prompt image 64, based on information received from database 66 and/or one or more of the storage devices 42, 44, 46, and 48 of article database 40. In one aspect, in response to reading an article identifier 22, processing device 30 displays each of images 58, 60, 62, and 64.

As shown in FIG. 5, article image 58 may be an image provided to processing device 30 from image storage 44 depicting article 18 in a new or like-new condition. Article image 58 may assist a transfer operator in determining when an article identifier 22 and article 18 have been incorrectly paired.

An article identifier image 60 may be provided adjacent to article image 58. Article identifier image 60 may display one or more pieces of information encoded by article identifier 22. As noted above, this encoded information may form the basis for a query to storage devices 42, 44, 46, and/or 48 of article database 40 to allow processing device to identify article 18, including identification on a basis of a source, category, style, color, size, and/or serial number of article 18, one or more of which is display in article identifier image 60. In the example shown in FIG. 5, a serial number of article 18 which is unique to each article may be presented as article identifier image 60.

An article category image 62 may represent a status of article 18 as an article that has been received from a customer (R) or a new arrival (N). Image 62 may be received from article characteristics storage 42 based on an article identifier 22 read by reader 28. In one aspect, the status of the article represented by article category image 62 may be input by an operator prior to reading article identifier 22.

When the article identifier 22 is associated with a special care article, image 62 may form a notification that indicates the special care requirement. For example, the article category image 62 may form a notification indicative of an inspection requirement. As shown in the exemplary article category image 62 in the second column of image 50 in FIG. 5, for example, article category image 62 may prompt the operator to transfer article 18 to secondary inspection station 122. Any suitable image or text may be used for article category image 62.

Transfer processing device 30 may determine whether each article 18 is a special care article based on information received from article characteristics storage 42. Processing device 30 may cause display 32 to display a notification indicating that article 18 is a special care article by presenting an identifier prompt image 64. In one example, prompt image 64 may be indicative of articles that have a protective packaging requirement. In the example shown in FIG. 5, this prompt image 64 may be a 'print' icon that is displayed only for special care articles. In one aspect, the prompt image 64 may be presented only for articles 18 that includes at least one of silk, leather, or cashmere (including blends thereof), thus indicating that the article 18 is made of one or more of these materials. However, any suitable image or text may be used for prompt image 64. When the icon forming prompt image 64 is selected, e.g., by interacting with touch-screen display 32 or by a mouse, processing device 30 may cause labeler 20 to duplicate the identifier of corresponding article 18. Thus, prompt image 64 may also form a prompt that is presented on display 32 to prompt an operator to produce a copy or print a copy of the article identifier 22, e.g., with labeler 20.

Figure 6:
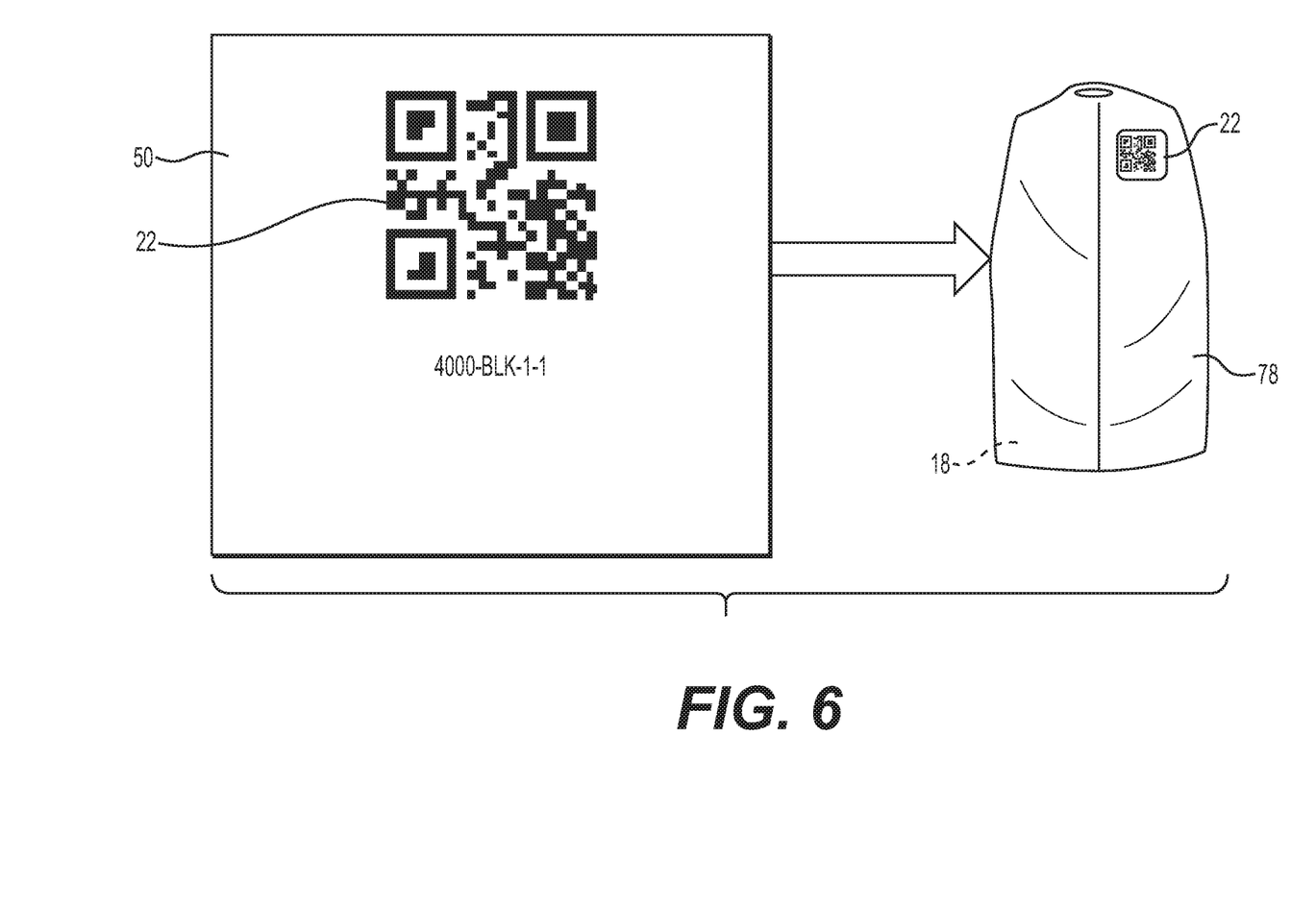
FIG. 6 illustrates an exemplary display of an article identifier and a duplicate article identifier for a special care article according to an embodiment of the present disclosure.

FIG. 6 illustrates an exemplary display of an article identifier 22 displayed on display 32 in an image 50 presented in response to a selection of prompt image 64, for example. As can be seen in FIG. 6, article identifier 22 (e.g., a two-dimensional barcode), is displayed on display 32. Processing device 30 may cause labeler 20 to produce a duplicate article identifier 22 corresponding to the displayed identifier, as shown in the right portion of FIG. 6. This duplicate article identifier 22 may be placed on an outside of, for example, a garment bag 78 to facilitate subsequent identification of article 18 with a reader 28 without removing the article 18 from bag 78. A duplicate article identifier 22 may be placed on the outside of any protective covering, including acid-free paper 72, or tissue paper 74.

Figure 7:
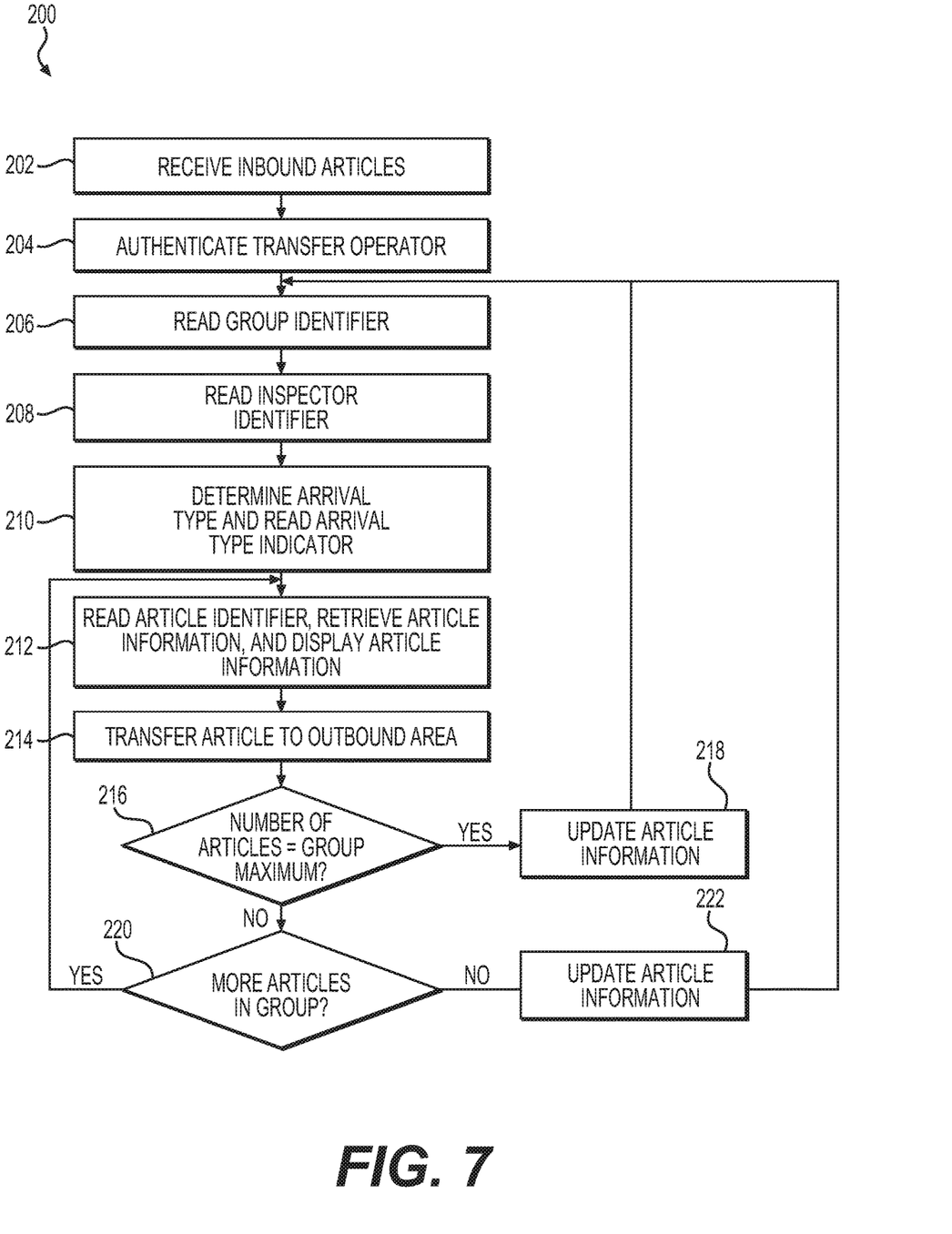
FIG. 7 is a flow diagram illustrating a transfer method according to an embodiment of the present disclosure.

FIG. 7 is a flow diagram illustrating an exemplary transfer method 200. In a first step 202 that may be performed throughout method 200, inbound articles 18 are received at transfer station 114. These inbound articles 18 may be received from inspection station 112 and placed, in order, in intake lane 102. These inbound articles 18 may be placed on a rack containing an inspector identifier 24. This inspector identifier 24 may identify one or more articles 18 that were inspected by the corresponding inspector in an inspection performed prior to the receipt of the inbound articles 18.

In a step 204, an operator of transfer processing device 30 (transfer operator) may be authenticated by processing device 30. This may be performed by presenting an authentication prompt (e.g., a prompt for a user identification and password), and receiving an authentication as described above. In response to an authentication of the transfer operator in step 204, processing device 30 may display a prompt for the transfer operator to read a group identifier (e.g., FIG. 4A).

In step 206, a group identifier 26 may be read by reader 28. In response to reading a group identifier 26, processing device 30 may display a prompt for the transfer operator to read an inspector identifier 24 (e.g., FIG. 4B). Once a group identifier 26 is read, processing device 30 may display group identifier information in group identifier image 54 (FIG. 5).

In a step 208, an inspector identifier 24 may be read by reader 28. The inspector identifier 24 may be the inspector identifier 24 located on a rack provided to intake lane 102. In response to reading the inspector identifier 24, processing device 30 may display inspector information in inspector identifier image 56 (FIG. 5). Step 208 may be performed prior to step 206, if desired.

Once steps 206 and 208 have been performed and a group identifier 26 and inspector identifier 24 have been read, processing device 30 may display an image 50 containing status indication 52, group identifier image 54, inspector identifier 56, and one or more columns in which article image 58, article identifier image 60, and article category image 62 will be presented in response to each article identifier 22 subsequently read by reader 28.

In a step 210, an arrival type (e.g., new arrival article or article from a user) may be determined. Step 210 may also include reading or otherwise inputting an arrival type indicator (FIG. 4C). Once step 210 is performed, transfer processing device 30 may be prepared to process one or more articles 18 for transfer, for example by generating a transfer order for each article identifier 22 read in step 212, as described below. However, step 210 may be omitted if desired.

In step 212, an identifier 22 for an article 18 removed from a rack in intake lane 102 may be read by reader 28. In response, processing device 30 may query article database 40 for article information for the corresponding article 18. In a reply to this query, article database 40 may provide information that is displayed in article image 58, article identifier image 60, and/or article category image 62.

In a step 214 following step 212, the article 18 that was previously removed from intake lane 102 may be transferred to an outbound area such as outbound lane 104. If the article 18 is the first article 18 in a group, (e.g., the article 18 corresponding to the first column in FIG. 5), step 214 may include placing the group identifier 26 on a rack or other holder in outbound lane 104 with article 18. Additionally, step 214 may include transferring one or more of the articles to a transfer or destination location 118. This transfer may occur repeatedly throughout the performance of method 200.

In step 216, transfer processing device 30 may determine whether the article identifier 22 read in step 212 fills or completes a group (e.g., when the group maximum is reached). Each group may be one or more articles 18 that can be associated with a particular group identifier 26. The group may be completed when, for example, five, ten, fifteen, or another predetermined number of article identifiers 22 are read and associated with a particular group identifier 26. Thus, the size of the group of articles 18 may correspond to the number of columns for images 58, 60, and 62, as shown in FIG. 5, for example.

When the determination in step 216 is affirmative, a group maximum has been reached. In response to this determination, in a step 218, transfer processing device 30 may proceed to update information for each of the articles 18 in the group associated with the group identifier 26. This may include, for example, storing information in one or more devices 42, 44, 46, 48 of article database 40. For example, transfer processing device 30 may update article characteristics storage 42 and/or article location storage 48 with the group identifier 26 and/or location associated with the group of articles. Step 218 may include generating a transfer order that indicates the destination location 118 for each of the articles 18 associated with the group identifier 26, and/or the destination location 118 for group identifier 26 itself. Method 200 may then return to step 206.

When the determination in step 216 is negative, the group of articles 18 has not yet reached the predetermined group maximum. Following such a determination in step 216, a determination step 220 may be performed. Step 220 may include determining whether there are more articles 18 to be added to the group corresponding to group identifier 26. When there are no more articles 18 to be added to the group. Following such a determination in step 220. If no additional articles 18 remain, completion entry 84 (FIG. 4D) may be read or otherwise selected in step 220.

In response to the determination in step 220 that no more articles 18 are to be added to the group, step 222 may be performed to update the information for the articles in the group. Step 222 may be performed in a similar manner as described with respect to step 218. Following or concurrent with step 222, method 200 may continue to step 206 where an additional group identifier 26 is read. Thus, another group of articles 18 may be prepared for transfer and generation of a transfer order. For example, article database 40 may update article location database 48 with a location of each of the articles 18 associated with the group identifier 26 with a destination of the articles in the group (e.g., a destination location 118).

When the determination in step 220 is affirmative, articles 18 remain to be added to the group, and the group has not yet reached a predetermined group maximum. Thus, method 200 proceeds from such a determination in step 220 to step 212 in which an additional article identifier 22 is read.

Method 200 may be performed to process a series of articles 18 for transfer by associating each of the articles 18 with a group identifier 26. Each group of articles 18 associated with a group identifier 26 may then be transferred to putaway staging area 116. Putaway staging area 116 is an area, for example, where articles 18 are transferred, in groups, to one or more destination locations 118. This transfer may be performed according to the transfer order(s) generated in steps 218 and/or 222. Each transfer order may provide an updated article location created by associating a group identifier 26 with a destination location 118, and by updating article location storage 48 accordingly (e.g., with the transfer order). Thus, the location of a group of articles 18 may be accurately recorded in an expeditious, accurate, and straightforward manner.

Figure 8:
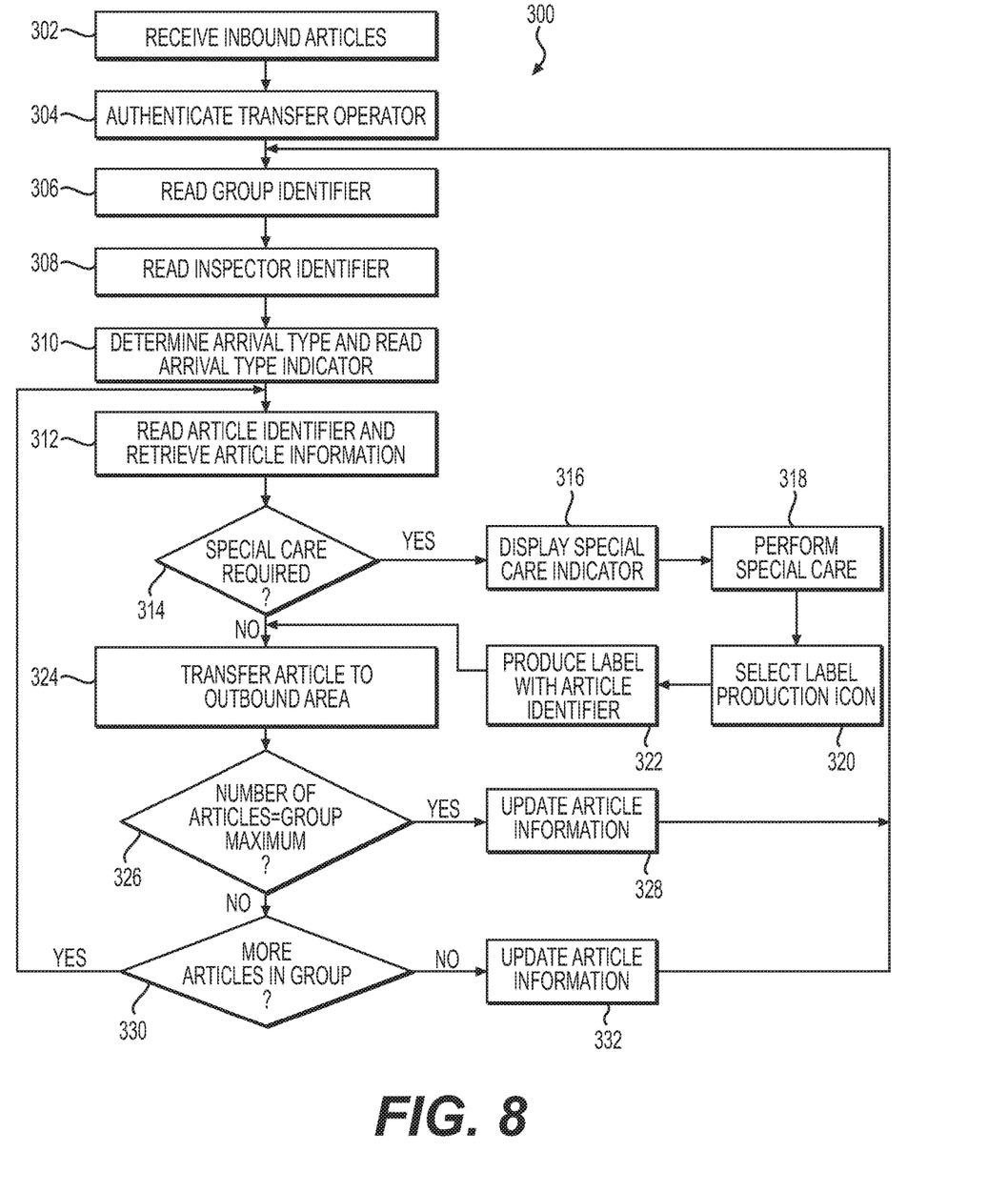
FIG. 8 is a flow diagram illustrating a transfer method including a process for a special care article according to an embodiment of the present disclosure.

FIG. 8 is a flow diagram illustrating an exemplary transfer method 300. In a first step 302, which may be performed in a manner similar to step 202 discussed above, inbound articles 18 are received at transfer station 114, e.g., at one or more intake lanes 102. These inbound articles 18 may be separated into groups or racks of special care articles and articles that do not require special care (non-special care articles). The articles 18 may also be provided as a mix of special care and non-special care articles 18. Step 302 may be performed throughout method 300.

In a step 304 performed concurrently or after step 302, an operator of transfer processing device 30 (transfer operator) may be authenticated by processing device 30 in a similar manner as discussed with respect to step 204.

Step 306 may include reading a group identifier 26 by reader 28 in a manner similar to step 206. Similarly, steps 308 and 310 may be performed in a similar manner as steps 208 and 210 described above.

In step 312, an article identifier 22 may be read by reader 28. Once an article identifier 22 has been read, transfer processing device 30 may query article database 40 for article information. This article information may include an indication as to whether the article 18 is a special care article or a non-special care article.

When the determination in step 314 is affirmative, when, for example, the article 18 is a silk, leather, angora, or cashmere article requiring special care, transfer processing device may display an indication in step 316. For example, display 32 may display a special care indicator formed by prompt image 64 and/or article category image 62. Thus, images 62 and/or 64 may indicate to an operator that the previously-read article identifier 22 corresponds to a special care article.

Following or in response to the display of a special care indicator in step 316, a special care may be performed in step 318. In one aspect, the performance of special care may correspond to, or form a part of the act of preparing the article for transfer based on the care information. The special care may be performed based on the type of article 18 and the type of special care requirement. In one aspect, special care may be performed based on the material of article 18. This special care may be performed based on the type of special care indicator indicated in step 316. Special care for a silk article may include a protective packaging requirement indicative of a requirement such as hanging the silk article 18 on a hanger 80 with acid-free paper 72 placed so as to surround the article 18 for protection. Special care for a leather article may include a protective packaging requirement indicative of a requirement to hang the article 18 on hanger 80 and place paper 72 over the article 18. The special care for pants made of leather may include placing the article 18 on a hanger 80 and surrounding the article 18 with tissue paper 74 for protection. For articles formed of cashmere or blends including cashmere, the special care performed in step 318 may include placing the article 18 in a garment bag 78.

As illustrated by the foregoing, the special care performed in step 318 may include placing the special care article 18 in a protective covering such as acid-free paper 72, tissue paper 74, garment bag 78, or another protective covering. The protective covering may therefore obscure or cover article identifier 22. Thus, in step 320, a label production icon such as prompt image 64 may be selected to produce a duplicate article identifier 22 with producer 20 (FIG. 6). In one aspect, prompt image 64 may form both the special care indicator displayed in step 316 and the label production icon selected in step 320. However, different indicators or icons may be displayed and selected in steps 316 and 320.

In response to the selection of the label production icon in step 320, article identifier producer 20 may produce a duplicate identifier 22 for the special care article identified in step 314. This duplicate article identifier 22 may be placed on the protective covering, such as garment bag 78, as shown in FIG. 6.

In a step 324 that may be performed following step 322, or in response to a determination in step 314 that the article 18 is not a special care article 18, the process may proceed to step 324. In step 324, the article 18 or special care article 18 may be transferred to an outbound area such as outbound lane 104. Outbound lanes 104 may be divided into areas or racks such that special care articles 18 are separated from articles 18 that do not require special care, for example, as shown in FIG. 2, where special care articles 18 are located in a lower outbound lane 104 while non-special care articles 18 are located in an upper outbound lane 104. Step 324 may also include transferring one or more of the articles 18 to a transfer or destination location 118.

Returning to step 318, the performance of special care may also be performed when the special care requirement is an inspection requirement, as indicated by article category image 62 in the second column of image 50 in FIG. 5, for example. In this example, special care may be performed by transferring the article 18 with the inspection requirement to secondary inspection station 122. In one aspect, when the special care requirement is an inspection requirement, the special care article may be separated from the remaining articles and transferred separately to secondary inspection station 122.

In step 326, transfer processing device 30 may determine whether the article identifier 22 read in step 212 fills or completes a group. This may be performed in a similar manner as described with respect to step 216. If the determination in step 326 is affirmative, and the number of articles is equal to the group maximum, step 328 may be performed in a manner similar to step 218. Following step 328, method 300 may return to step 306 where an additional group identifier is read by reader 28.

If the determination in step 326 is negative, the number of articles 18 associated with a particular group identifier 26 is less than the group maximum. The process may then proceed to step 330.

Determination step 330 may be performed in a similar manner as step 220 above to determine whether articles 18 remain to be added to the group of articles 18 associated with group identifier 26. If the determination in step 330 is negative, no more articles 18 are to be added to the group and step 332 may be performed in a manner similar to step 222. Following step 332, the process may proceed to step 306 where an additional group identifier 26 is read to prepare another group of articles 18 for transfer. If the determination in step 330 is affirmative, more articles 18 remain to be added to the group for group identifier 26, and the group has not yet reached the predetermined group maximum. Method 300 may proceed to step 312 where an article identifier 22 for a new article 18 is read, allowing transfer processing device 30 to add the article 18 to the group.

Thus, method 300 may be performed to process a series of articles 18 for transfer, by associating each of the articles 18 with a group identifier 26. Each group of articles 18 may then be transferred to putaway staging area 116. Each article location may then be updated by associating a group identifier 26 with a destination location 118 and updating article location storage 48 accordingly. Thus, the location of a group of articles 18 may be accurately recorded. Additionally, each article 18 requiring special care may be identified via processing device 30 during transfer process. If desired, any special care articles 18 may be grouped together, allowing special care articles 18 to be stored separately and placed in protective or climate-controlled storage as necessary.

Transfer processing device 30 may allow a transfer operator to accurately and expeditiously prepare articles for transfer. In one aspect, the transfer processing device 30 may readily identify or flag articles that require special care, facilitate the performance of the special care, and update the location of the articles. By associating each article with a group identifier, each article may be readily transferred to a destination location, without the need to independently modify a location of each article by the operator.

What is claimed is:
1. A computer-implemented method of preparing temporary use articles for transfer, the method comprising:
receiving a plurality of articles at a transfer station of a fulfillment center that is part of a workflow for providing the plurality of articles, including a plurality of wearable items, as a service, following temporary use of the plurality of articles by one or more users, the transfer station comprising at least one intake area, at least one outbound area, a transfer processor in communication with an article reader and an article labeler provided at the transfer station, the plurality of articles being received at the at least one intake area of the transfer station following an inspection of the plurality of articles following their temporary use;
identifying, by the transfer processor, one of the articles from the at least one intake area by reading an article identifier of the article with the article reader of the transfer station by receiving information encoded in the article identifier of the article from the article reader;
retrieving, by the transfer processor, care information for the identified article, the identified article being received from a first end user, based on the information encoded in the article identifier that is received by the transfer processor while the identified article is located at the transfer station, wherein when the identified article is an article requiring special care, and a special care requirement is included in the care information that is retrieved by the transfer processor;
preparing the identified article for transfer based on the special care requirement that is included in the care information retrieved by the transfer processor by placing the identified article in a protective packaging at the transfer station after the inspection;
creating, with the article labeler, an additional article identifier that is a duplicate of the article identifier for the identified article, based on the special care requirement retrieved by the transfer processor in response to the article identifier being read by the article reader;
placing the additional article identifier on the protective packaging at the transfer station; and providing the identified article in the protective packaging to a second end user that is different than the first end user following the special care of the identified article.

2. The method of claim 1, wherein the care information is indicative of an article that includes at least one of silk, leather, angora, or cashmere.

3. The method of claim 1, further including causing a display to display a notification indicative of the special care requirement, the special care requirement being associated with an action for protecting the identified article before placing the article in the at least one outbound area of the transfer station.

4. The method of claim 1, further including presenting a prompt, by the transfer processor, to produce a copy or print a copy of the article identifier by the article labeler.

5. The method of claim 1, wherein the article identifier encodes a source, category, style, color, or size of the article, and wherein the article identifier further encodes a unique identification of the article.

6. The method of claim 1, wherein the protective packaging includes acid-free paper and the article label encoding the additional article identifier is placed on an outside of the acid-free paper.

7. The method of claim 1, further including:
identifying a group identifier by reading the group identifier with the article reader; and
updating, by the transfer processor, the article information in an article database by associating a plurality of article identifiers with the group identifier in the article database.

8. The method of claim 1, further including:
identifying a group identifier for a group of articles, including the identified article, by reading the group identifier at the transfer station with the article reader;
updating, by the transfer processor, article information in an article database by associating the article identifiers corresponding to the group of articles with the group identifier in the article database;
placing the group of articles together in the at least one outbound area, each article of the group of articles having been previously located in the at least one intake area of the transfer station; and
transferring the group identifier associated with the group of articles from a first location of the transfer station to a second location of the transfer station, the second location being the at least one outbound area of the transfer station.

9. A system for preparing temporary use articles for transfer, the system comprising:
a plurality of articles at a transfer station of a fulfillment center that is part of a workflow for providing the plurality of articles, including a plurality of wearable items, that were received as part of a service, following temporary use of the plurality of articles by one or more users, the transfer station comprising:
at least one intake area;
at least one outbound area;
a transfer processor in communication with an article reader; and
an article labeler provided at the transfer station;
the plurality of articles having been received at the at least one intake area of the transfer station following an inspection of the plurality of articles following their temporary use,
a transfer processor configured to:
identify, one of the articles from the at least one intake area by reading an article identifier of the article with the article reader of the transfer station by receiving information encoded in the article identifier of the article from the article reader, and
retrieve care information for the identified article, the identified article having been received from a first end user, based on the information encoded in the article identifier that is received by the transfer processor while the identified article is located at the transfer station, wherein when the identified article is an article requiring special care, and a special care requirement is included in the care information that is retrieved by the transfer processor,
the identified article, which has been prepared for transfer based on the special care requirement that is included in the care information retrieved by the transfer processor by having been placed in a protective packaging at the transfer station after the inspection;
wherein the article labeler creates an additional article identifier that is a duplicate of the article identifier for the identified article, based on the special care requirement retrieved by the transfer processor in response to the article identifier having been read by the article reader,
wherein the additional article identifier is disposed on the protective packaging at the transfer station, and
wherein the identified article is disposed in the protective packaging for providing the identified article to a second end user that is different than the first end user following the special care of the identified article.

10. The system of claim 9, wherein the care information is indicative of an article that includes at least one of silk, leather, angora, or cashmere.

11. The system of claim 9, further including a display that displays a notification indicative of the special care requirement, the special care requirement being associated with an action for protecting the identified article before placing the article in the at least one outbound area of the transfer station.

12. The system of claim 9, wherein the transfer processor is configured to present a prompt to produce a copy or print a copy of the article identifier by the article labeler.

13. The system of claim 9, wherein the article identifier encodes a source, category, style, color, or size of the article, and wherein the article identifier further encodes a unique identification of the article.

14. The system of claim 9, wherein the protective packaging includes acid-free paper and the article label encoding the additional article identifier is placed on an outside of the acid-free paper.

15. The system of claim 9, wherein the transfer processor is configured to:
identify a group identifier by reading the group identifier with the article reader, and
update the article information in an article database by associating a plurality of article identifiers with the group identifier in the article database.

16. The system of claim 9, wherein the transfer processor is configured to:
identify a group identifier for a group of articles, including the identified article, by reading the group identifier at the transfer station with the article reader, and
update article information in an article database by associating the article identifiers corresponding to the group of articles with the group identifier in the article database.

* * * * *